United States Patent

Oliver et al.

(12) United States Patent
(10) Patent No.: US 7,526,002 B2
(45) Date of Patent: Apr. 28, 2009

(54) CONCURRENT TRANSMISSION OF TRAFFIC FROM MULTIPLE COMMUNICATION INTERFACES

(75) Inventors: Jeffrey Oliver, Tustin, CA (US); Craig Evensen, Trabuco Canyon, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 271 days.

(21) Appl. No.: 11/425,565

(22) Filed: Jun. 21, 2006

(65) Prior Publication Data

US 2006/0233188 A1 Oct. 19, 2006

Related U.S. Application Data

(63) Continuation of application No. 10/008,658, filed on Nov. 9, 2001, now Pat. No. 7,088,742.

(51) Int. Cl.
*H04J 3/02* (2006.01)
(52) U.S. Cl. ........................... 370/537; 370/468
(58) Field of Classification Search ......... 370/485–487, 370/463, 442–444, 458–462, 419–420, 438, 370/468
See application file for complete search history.

(56) References Cited

U.S. PATENT DOCUMENTS

| 5,570,355 | A | 10/1996 | Dail et al. |
| 5,999,518 | A | 12/1999 | Nattkemper et al. |
| 6,101,198 | A | 8/2000 | Koenig et al. |
| 6,351,452 | B1 | 2/2002 | Koenig et al. |
| 6,373,860 | B1 * | 4/2002 | O'Toole et al. ............ 370/493 |
| 6,473,429 | B1 | 10/2002 | Christie |
| 6,490,273 | B1 * | 12/2002 | DeNap et al. ............... 370/352 |
| 6,490,296 | B2 | 12/2002 | Shenoi et al. |
| 6,493,346 | B1 | 12/2002 | Cantwell et al. |
| 6,920,118 | B2 * | 7/2005 | Lozano ....................... 370/329 |
| 7,075,935 | B1 * | 7/2006 | Humphrey ................ 370/395.6 |
| 7,088,742 | B2 | 8/2006 | Oliver |
| 2001/0036232 | A1 | 11/2001 | Betts |
| 2002/0054597 | A1 * | 5/2002 | O'Toole et al. ......... 370/395.41 |
| 2002/0176411 | A1 | 11/2002 | Nattkemper |
| 2003/0086515 | A1 | 5/2003 | Trans et al. |
| 2003/0091061 | A1 * | 5/2003 | Oliver et al. ................. 370/463 |

(Continued)

FOREIGN PATENT DOCUMENTS

EP 0683579 11/1995

(Continued)

OTHER PUBLICATIONS

A Technical Discussion of SHDSL and Its Benefits by Efficient Networks, Third Quarter 2001.*

(Continued)

*Primary Examiner*—Edan Orgad
*Assistant Examiner*—Salman Ahmed
(74) *Attorney, Agent, or Firm*—Fogg & Powers LLC

(57) ABSTRACT

Line termination units having dual ports for accepting communication traffic of two different types facilitate the concurrent transmission of voice traffic, serial data traffic and packetized data traffic across a telecommunication transport system, such as a DSL (digital subscriber line) system. The bandwidth of the telecommunication transport system is allocated between the differing traffic types to permit the full utilization of the available bandwidth.

10 Claims, 4 Drawing Sheets

U.S. PATENT DOCUMENTS

| | | | |
|---|---|---|---|
| 2003/0133438 A1* | 7/2003 | Richarson et al. | 370/352 |
| 2005/0036540 A1* | 2/2005 | Noma et al. | 375/222 |
| 2005/0186933 A1 | 8/2005 | Trans | |
| 2008/0205298 A1* | 8/2008 | Polland et al. | 370/254 |
| 2008/0205449 A1* | 8/2008 | Polland et al. | 370/480 |
| 2008/0215385 A1* | 9/2008 | Veitch | 705/6 |

FOREIGN PATENT DOCUMENTS

| | | | |
|---|---|---|---|
| EP | 1041854 | | 10/2000 |
| WO | 0067385 | | 11/2000 |
| WO | WO03041284 | * | 5/2003 |
| WO | WO03041316 | * | 5/2003 |

OTHER PUBLICATIONS

A 285 mW CMOS single chip analog front end for G.SHDSL; Laaser, P.; Eichler, T.; Wenske, H.; Herbison, D.; Eichfeld, H.; Solid-State Circuits Conference, 2001. Digest of Technical Papers. ISSCC. 2001 IEEE International; Feb. 5-7, 2001 pp. 298-299, 456.*

Overview of SHDSL system performance; Daecke, D.; Broadband Communications for the Internet Era Symposium digest, 2001 IEEE Emerging Technologies Symposium on Sep. 10-11, 2001 pp. 2-6.* xDSL tutorial and standards update; Palm, S.; Consumer Electronics, 2000. ICCE. 2000 Digest of Technical Papers. International Conference on Jun. 13-15, 2000 pp. 68-69.*

* cited by examiner

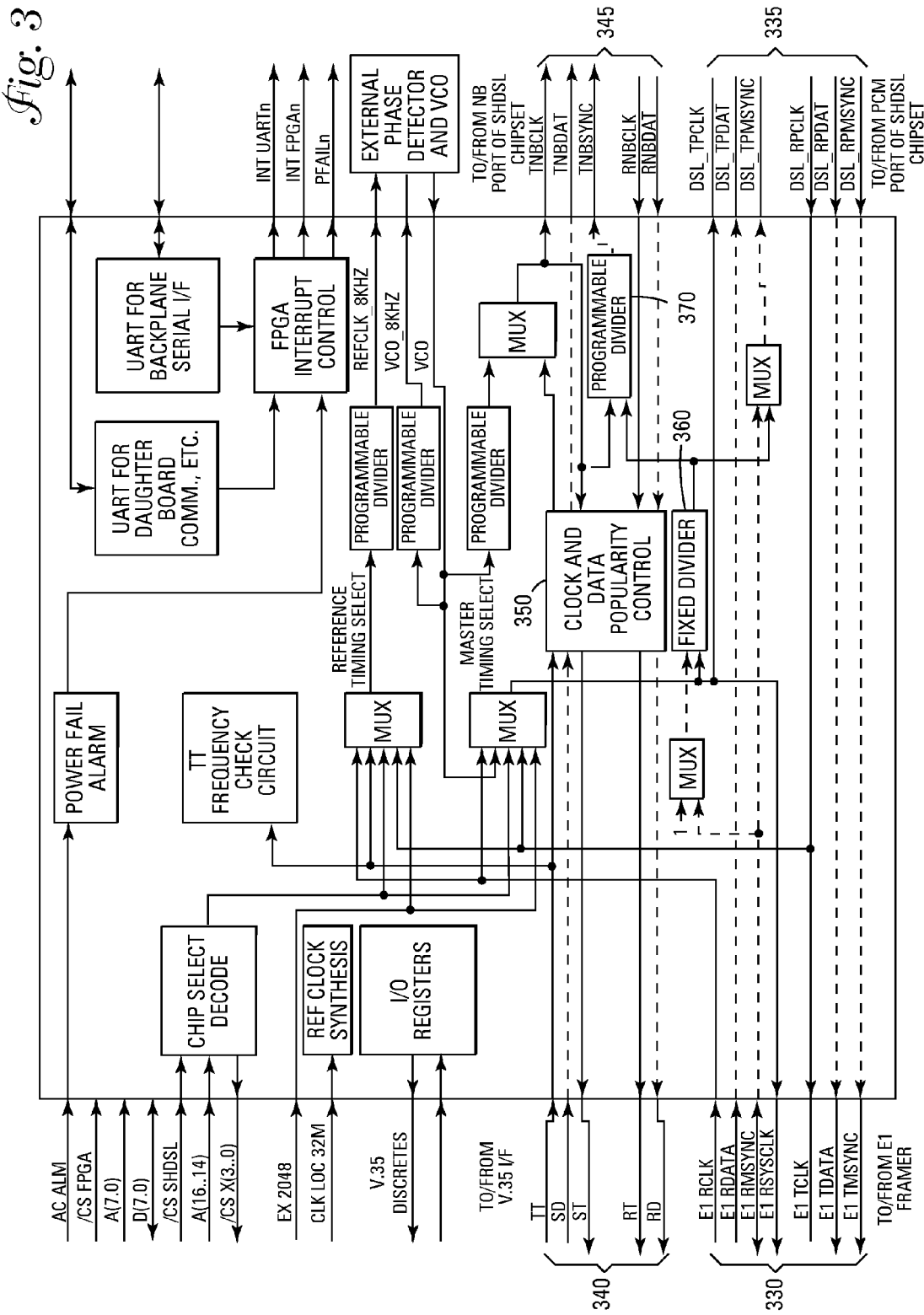

CONCURRENT TRANSMISSION OF TRAFFIC FROM MULTIPLE COMMUNICATION INTERFACES

RELATED APPLICATIONS

The present invention is a continuation of U.S. application Ser. No. 10/008,658 filed on Nov. 9, 2001 now U.S. Pat. No. 7,088,742, which is incorporated herein it its entirety by reference.

TECHNICAL FIELD OF THE INVENTION

The present invention relates generally to telecommunications, and in particular to apparatus and methods to facilitate concurrent transmission of multiple communication protocols across a single long-distance communication carrier.

BACKGROUND OF THE INVENTION

A number of communication transport protocols have been defined to carry voice and/or data traffic across large spans. Two examples of protocols for carrying both traditional Pulse Code Modulated (PCM) voice traffic as well as packetized data traffic include the time division multiplexed (TDM) protocols commonly referred to as T1 (United States) and E1 (Europe). These two protocols have many similarities, but differ significantly regarding their respective payload rates. T1 traffic has a bit rate of 1544 Kbps divided into 24 timeslots, or channels, of 64 Kbps each while E1 traffic has a bit rate of 2048 Kbps divided into 32 timeslots of 64 Kbps each. An emerging standard for voice and data traffic is the G.shdsl (ITU G.991.2) standard for SHDSL (single-pair high bit-rate digital subscriber line) datalinks, or spans, capable of bit rates as high as 2304 Kbps, or 36 timeslots of 64 Kbps each.

As telecommunication technology advances, faster transmission rates are facilitated. However, the latest technology will generally not be implemented across the board. As such, communication from a sending node to a receiving node in a telecommunication transport system may have spans of differing technologies. The interface between various protocols can result in wasted bandwidth. For example, a SHDSL span would be limited to 1544 Kbps or 2048 Kbps if interposed between two T1 spans or two E1 spans, respectively, resulting in a loss of potential bandwidth.

For the reasons stated above, and for other reasons stated below that will become apparent to those skilled in the art upon reading and understanding the present specification, there is a need in the art for alternative apparatus and methods for increasing bandwidth utilization of telecommunication spans.

SUMMARY

Line termination units are described herein having dual ports for accepting communication traffic of two different types. The various embodiments facilitate the concurrent transmission of voice traffic, serial data traffic and packetized data traffic across a telecommunication transport system, such as a DSL (digital subscriber line) system. The bandwidth of the telecommunication transport system is allocated between the differing traffic types to permit the full utilization of the available bandwidth.

For one embodiment, the invention provides a termination unit for use in a digital subscriber line system. The termination unit includes a first communication interface adapted for receiving first traffic having a bandwidth and a second communication interface adapted for receiving second traffic different from the first traffic. The termination unit further includes a third communication interface for coupling to a digital subscriber line. The termination unit is adapted to combine the first traffic received at the first communication interface with the second traffic received at the second communication interface, thereby generating a combined traffic, and to provide the combined traffic to the third communication interface. The combined traffic has a bandwidth greater than or equal to the bandwidth of the first traffic.

For another embodiment, the invention provides a termination unit for use in a digital subscriber line system. The termination unit includes a first communication interface adapted for receiving first traffic having a first number of timeslots, each timeslot corresponding to an incremental bit rate, wherein a number ($N_1$) of timeslots used for payload is less than or equal to the first number of timeslots. The termination unit further includes a second communication interface adapted for receiving second traffic, wherein the second traffic has a bit rate equal to some multiple ($N_2$) of the incremental bit rate. The termination unit further includes a third communication interface for coupling to a digital subscriber line and for providing a combined traffic having a second number of timeslots, each timeslot corresponding to the incremental bit rate, wherein the second number of timeslots is greater than or equal to $N_1+N_2$. The termination unit is adapted to map the timeslots of the first traffic to a first portion of the timeslots of the combined traffic. The termination unit is further adapted to map the second traffic to a second portion of the timeslots of the combined traffic.

For yet another embodiment, the invention provides a method of communicating across a digital subscriber line system. The method includes receiving a first traffic having a bandwidth and receiving a second traffic different from, and concurrently with, the first traffic. The method further includes combining data of the first traffic with the data of the second traffic to generate a combined traffic, and providing the combined traffic to a digital subscriber line of the digital subscriber line system.

For still another embodiment, the invention provides a method of communicating across a digital subscriber line system. The method includes receiving first traffic having a first number of timeslots, each timeslot corresponding to an incremental bit rate, wherein a number ($N_1$) of timeslots used for payload is less than or equal to the first number of timeslots. The method further includes receiving second traffic, wherein the second traffic has a bit rate equal to some multiple ($N_2$) of the incremental bit rate, and combining the first traffic and the second traffic to generate a combined traffic having a second number of timeslots. Each timeslot of the combined traffic corresponds to the incremental bit rate and the second number of timeslots is greater than or equal to $N_1+N_2$. The method still further includes mapping the timeslots of the first traffic to a first portion of the timeslots of the combined traffic and mapping the second traffic to a second portion of the timeslots of the combined traffic.

Further embodiments of the invention include apparatus and methods of varying scope.

BRIEF DESCRIPTION OF THE DRAWINGS

FIG. 3 is a block schematic of a synchronizer in accordance with an embodiment of the invention.

FIGS. 4A-4F are depictions of example timeslot assignments in accordance with embodiments of the invention.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

The various embodiments facilitate the concurrent transmission of voice traffic, serial data traffic and packetized data traffic across a telecommunication transport system, such as a DSL (digital subscriber line) system. The bandwidth of the telecommunication transport system is allocated between differing traffic types to permit the full utilization of the available bandwidth.

Figure 1:
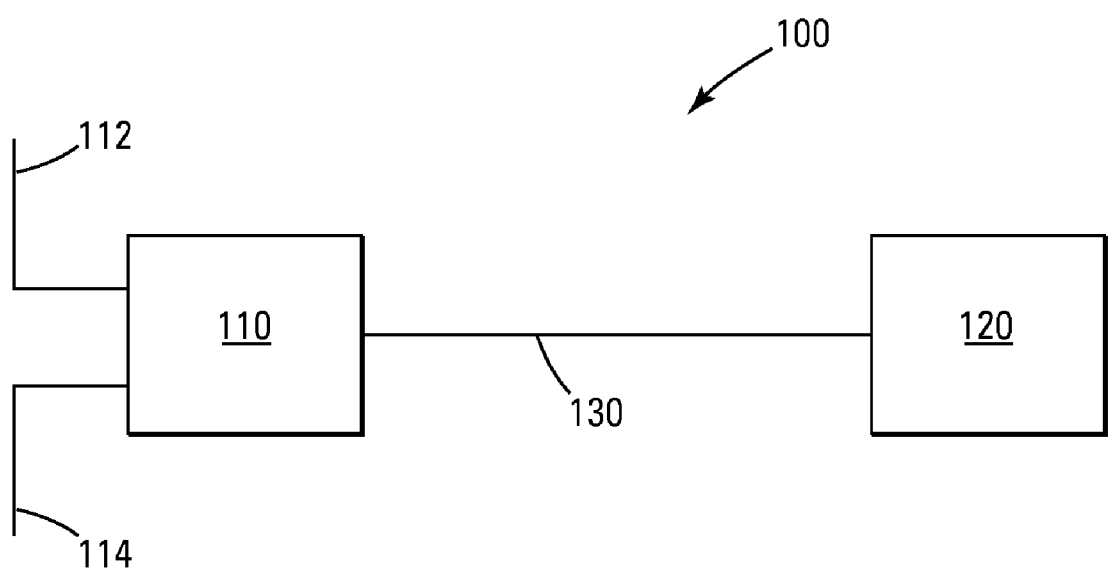
FIG. 1 is a block schematic of a telecommunication transport system in accordance with an embodiment of the invention.

FIG. 1 is a schematic of a telecommunication transport system 100 in accordance with an embodiment of the invention. The system 100 includes a first node 110 and a second node 120 coupled by a span 130. The span 130 is a digital subscriber line (DSL) span. For a further embodiment, the DSL span is a single-pair high bit-rate digital subscriber line (SHDSL) span. Such spans typically contain one pair or two pairs of twisted copper. The first node 110 may be a line termination unit (LTU) located at a central office (CO) of a telecommunication provider while the second node 120 may be a network termination unit (NTU) located at a customer site for interfacing to customer premise equipment (CPE). The LTU is generally a master device, controlling and monitoring other units, such as the NTU.

Although both nodes 110 and 120 are generally adapted for bi-directional communication, FIG. 1 will be discussed with the first node 110 acting as a sending device and the second node 120 acting as a receiving device, noting that the roles can be reversed and that the bi-directional communication can occur concurrently.

The first node 110 transmits information to the second node 120 across the span 130 using an appropriate communication protocol. For one embodiment, the span 130 is a SHDSL span using the G.shdsl standard. Traffic on the span 130 has a bandwidth, or available bit rate, as defined by its communication protocol. Continuing the G.shdsl example, the maximum bandwidth would be 2304 Kbps as currently defined. As noted earlier, this traffic is divided into 36 timeslots of 64 Kbps each. The actual bandwidth of the span 130 is determined by the number of timeslots utilized times the incremental bit rate for each timeslot, in this case 64 Kbps.

The first node 110 receives the transmission information from multiple communication interfaces. A first communication interface 112 is coupled to receive communication traffic of a first type, such as pulse code modulated (PCM) voice traffic and/or packetized data traffic. This first traffic has a bandwidth of less than the maximum bandwidth of the span 130. For example, the first communication interface 112 may be a G.703/704 interface coupled to receive E1 traffic having a maximum bandwidth of 2048 Kbps as currently defined. Such E1 traffic is divided into 32 timeslots of the incremental bit rate of 64 Kbps each.

Some number ($N_1$) of the timeslots of the first traffic may be used for application data, or payload. The number of timeslots used for payload may range from zero (an unused interface) to the total number of timeslots of the available bandwidth and is user definable. Using E1 traffic as an example, between 0 and 32 timeslots may be used for payload. As currently defined, the first timeslot (timeslot 0) of E1 traffic is reserved for framing information unless $N_1$ is 32, i.e., where each timeslot is used for payload. In addition, the seventeenth timeslot (timeslot 16) of E1 traffic is reserved for signaling information unless $N_1$ is greater than or equal to 31. The timeslots utilized for payload may be contiguous, but there is no requirement to do so. For example, for E1 traffic utilizing 11 timeslots for payload, the payload may reside in timeslots 1-11. Alternatively, the payload timeslots may be non-contiguous, such as timeslots 4-8, 13-15 and 17-19.

A second communication interface 114 is coupled to receive communication traffic of a second type different from the first type. For one embodiment, the second communication interface 114 is a serial dataport coupled to receive serial data. For a further embodiment, the second communication interface 114 is an N×64 Kbps interface coupled to receive serial data having a bandwidth that is some multiple ($N_2$) of an incremental bit rate, in this case 64 Kbps.

Figure 2:
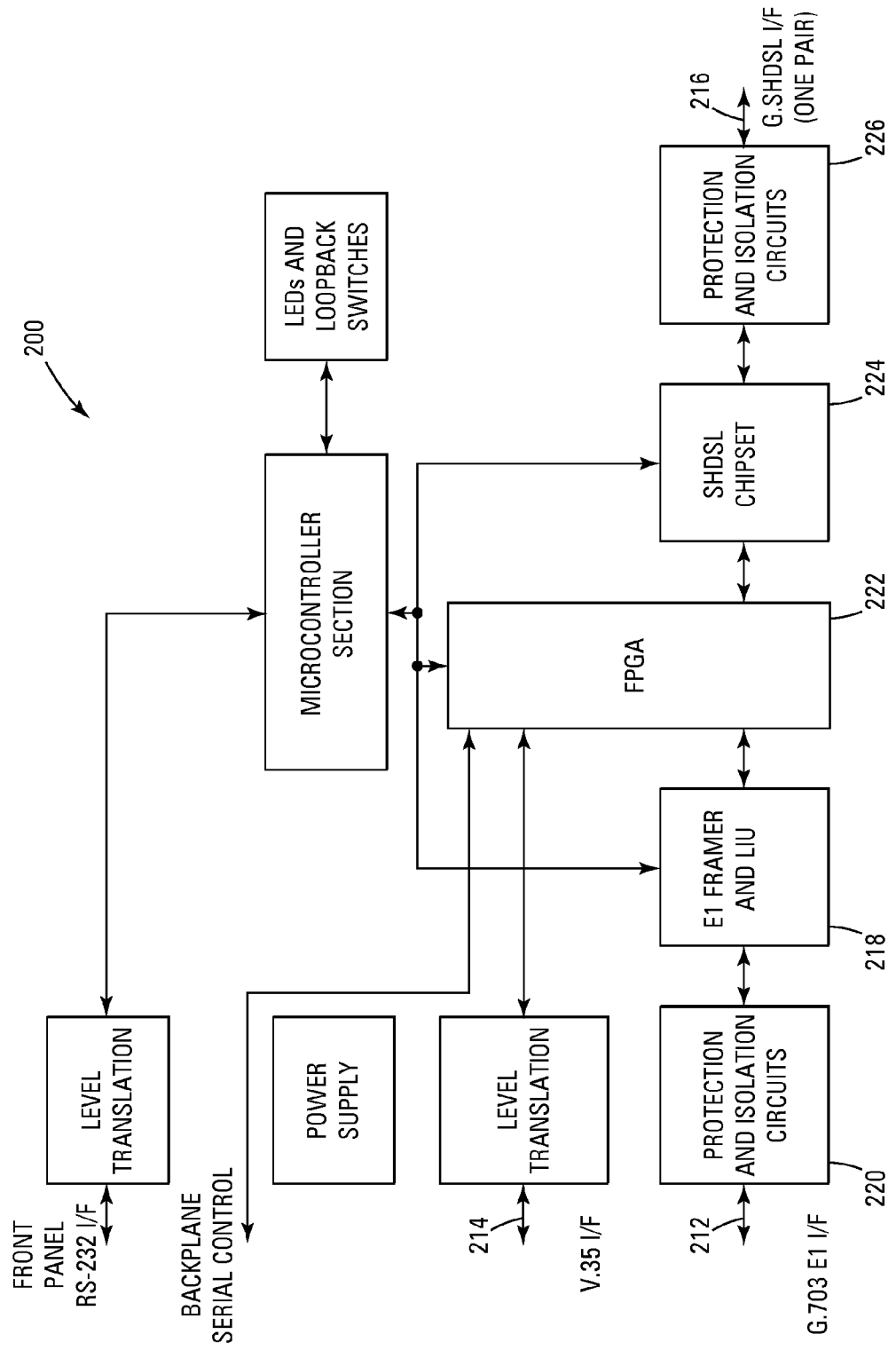
FIG. 2 is a block schematic of a line termination unit in accordance with an embodiment of the invention.

The following discussion will relate to an embodiment of a line a termination unit 200 having an E1 interface as the first communication interface 212 and a serial dataport interface as the second communication interface 214 as depicted in FIG. 2. The termination unit 200 is adapted for coupling to a DSL. For one embodiment, the termination unit 200 is adapted for coupling to a SHDSL through an SHSDSL interface as the third communication interface 216.

The E1 interface 212 provides a 2048 Kbps bi-directional digital interface for user application data as a PCM data stream. For one embodiment, it includes an E1 Framer and Line Interface Unit (LIU) 218 as well as protection and isolation circuits 220. The E1 interface 212 may provide the following controls:

1) Line coding and decoding according to HDB3.
2) Receive frame synchronization: unframed, G.704 (FAS), CRC-4, CAS Multiframe.
3) Timeslot 0 (FAS) regeneration or transparent transmission.
4) Optional regeneration of CRC-4 data and framing at the output data.
5) Monitoring of incoming CRC4 errors, Bipolar violations, and E-bits.
6) LOS, LFA, RAI, AIS alarm indication
7) Generation of A-bits, E-bits in response to alarms, CRC4 errors
8) Transmission of unframed all ones (AIS).
9) Diagnostic loopbacks towards and away from the interface
10) Programmable Channel blanking and Idle code pattern on output.

In the receive path, incoming data at the E1 interface 212 may be unframed (i.e. full 2048 Kbps) or framed according to G.704 with 32 distinct 64 Kbps channels (8-bit timeslots), and an alternating frame alignment (FAS), non-frame alignment word (NFAS) in timeslot 0. Timeslot 16 is reserved for network common channel (CCS) or channel associated signaling (CAS), and should always be transparently mapped in structured application modes, unless the user selects 31 timeslots assigned to the E1 port.

The serial dataport interface 214 provides a V.35, V.36 (with X.21option), RS-530 or other similar standard Nx64 Kbps bi-directional interface providing a bandwidth that is some multiple ($N_2$) of the incremental bit rate of 64 Kbps, such that $N_2$ ranges from 0 to 36. The firmware may monitor and assert the control signals associated with this interface and engage loopbacks.

The termination unit 200 further includes a synchronizer 222. This synchronizer 222 synchronizes the E1 and serial data flow, presenting them towards the SHDSL interface 216. The synchronizer 222 may be implemented as a field-programmable gate array (FPGA), application-specific integrated circuit (ASIC) chip or other control logic block.

The termination unit 200 further includes a SHDSL chipset 224 for mapping the synchronized PCM data stream from the synchronizer 222 into a SHDSL frame, and for presenting it to the SHDSL interface 216 for output over a SHDSL span. In the receive direction, the SHDSL chipset 224 presents the data as PCM and narrowband datastreams towards the synchronizer 222. The synchronizer 222 and SHDSL chipset 224 may be separate elements as shown in FIG. 2, or their function may be combined in a single processor block.

For one embodiment, the SHDSL chipset 224 is the CX28975 SHDSL chipset available from Mindspeed Technologies, Newport Beach, Calif., USA. This chipset has two ports. The first port is referred to as a PCM port. The second port is referred to as a narrowband port. The two ports may be caused to operate simultaneously if a synchronization pulse (sync pulse or framing pulse) on the narrowband port is synchronized with the PCM port. For the Mindspeed chipset, the period of the sync pulse to the PCM port is a multiple of 125 microseconds, typically 2 ms or 6 ms, while the period of the sync pulse to the narrowband port is 6 ms. For close synchronization, e.g., within 100 microseconds, the sync pulse associated with the narrowband port is generated from the sync pulse for the PCM port. This process is described in U.S. patent application Ser. No., entitled "Multiple Dataport Clock Synchronization," which is commonly assigned and incorporated herein by reference. The sync pulse associated with the narrowband port is further widened or shortened to be one narrowband port clock period wide.

The synchronizer 222 and SHDSL chipset 224 may provide the following functionality:
1) Programming transmit map, route table, receive map and combine tables including FIFO waterlevels according to desired application mode.
2) Control frame or multiframe synchronization.
3) Set SHDSL line rate and frame length
4) SHDSL link acquisition and maintenance
5) Send and receive EOC messages.
6) Monitor SHDSL status: signal-to noise ratio, loop attenuation, CRC6 errors, far-end-block-errors (FEBE) and remote alarms.

Data from the E1 interface 212 passes through the synchronizer 222 and is presented to the SHDSL chipset 224 at a first input, or PCM input (not shown in FIG. 2) at a sustained 2048 Kbps bit rate. Serial dataport data (which may a fractional Nx64 k rate) is passed through the synchronizer 222 and is presented to the SHDSL chipset 224 at a second input, or narrowband input (not shown in FIG. 2). The SHDSL chipset 224 buffers the PCM and narrowband data and then combines the data into a single serial data stream for transport across the SHDSL span. It is preferred that all timeslots of the E1 traffic be mapped contiguously onto the single SHDSL span up to the available number of SHDSL payload timeslots.

FIG. 3 is a block schematic of a synchronizer 222 in accordance with an embodiment of the invention. Only that portion of the synchronizer 222 relating to the interface with the SHDSL chipset 224 will be described.

An interface 330 to the E1 framer and LIU 218 passes through to the PCM port 335 of the SHDSL chipset 224, with the exception of the clock signal DSL_TPCLK, or master clock, which is provided by a master timing select circuit.

An interface 340 to the serial dataport interface 214 is passed to the narrowband port 345 of the SHDSL chipset 224 through a clock and data polarity control block 350. For one embodiment, the clocking of the narrowband port 345, via the TNBCLK signal, is generated in Nx64K increments that is phase locked to the DSL_TPCLK signal. The TNBCLK signal is also passed through the clock and data polarity control block 350 and used to drive the sent timing (DP_ST) signal of the serial data port. The SHDSL narrowband receive clock (RNBCLK) and data (RNBDAT) are passed through the clock and data polarity control block 350 to the Receive clock (RT) and data (RD) of the serial dataport. The narrowband transmit data (TNBDAT) is driven from the sent data (DP_SD) of the serial dataport.

The serial dataport is capable of accepting data at a Nx64K rate. This is to say that any multiple of 64 KHz, up to 2304 KHz can be used as the input clock rate. The Dataport input clock must be locked to the DSL_TPCLK signal to ensure the input/output FIFOs are not over/under run during a steady state operation or vice-versa. When the Nx64 KHz Dataport transmit timing clock (DP_TT) is selected as the timing reference for the system, a clock synthesizer circuit is used to create a fixed 2048 KHz reference to output as the DSL_TPCLK. When a source other than the DP_TT clock is selected for the system timing reference, the clock synthesizer circuit is used to create a Nx64 KHz DP_ST clock source the serial dataport must use for its timing reference.

For one embodiment, the sync pulse TNBSYNC for the narrowband port 345 is derived from the receive multiframe sync pulse E1_RMSYNC from the E1 interface 330. The E1_RMSYNC sync pulse is a 2 ms pulse having a duration of approximately 500 nanoseconds. In order to create a 6 ms sync pulse, which is required for the narrow band port of the Mindspeed chipset, the E1_RMSYNC sync pulse is first divided down using the fixed divider 360 to create a 6 ms sync pulse. The resulting intermediate 6 ms sync pulse will still have the same duration as the E1_RMSYNC pulse at this point. This intermediate sync pulse with a 6 ms duration may optionally be output to the DSL_TPMSYNC signal (not shown). The intermediate sync pulse is then widened or shortened using a programmable divider 370 to produce the sync pulse TNBSYNC having a 6 ms interval and a duration substantially equal to one clock interval of the clock signal TNBCLK. The narrow band sync pulse TNBSYNC should be phase aligned with the E1_RMSYNC sync pulse output by the E1 framer 218. The narrow band sync pulse TNBSYNC should occur within 0-100 microseconds after the E1_RMSYNC sync pulse. As the frequency of the narrow band clock TNBCLK may vary, the value loaded into the divider circuit of the programmable divider 370 must also vary. A down counter is used to create the programmable divider 370. The equation to calculate the counter re-load value is: Reload Value=convert to hex(6 ms*TNBCLK (freq)−2).

The following tables provide examples of mapping of the combined traffic and accompany FIGS. 4A-4F. In these examples E is for E1 data from the first communication interface, D is for dataport data from the second communication interface, F is for framing information (timeslot 0), S is for signaling information (timeslot 16, if applicable), and X is for unused. Unused timeslots are generally filled with user-defined idle code. In FIGS. 4A-4F, the top line of each figure corresponds to the DSL mapping of an LTU as a first node while the bottom line of each figure corresponds to the DSL mapping of an NTU as a second node.

Figures 4A, 4B, 4C, 4D, 4E, 4F:
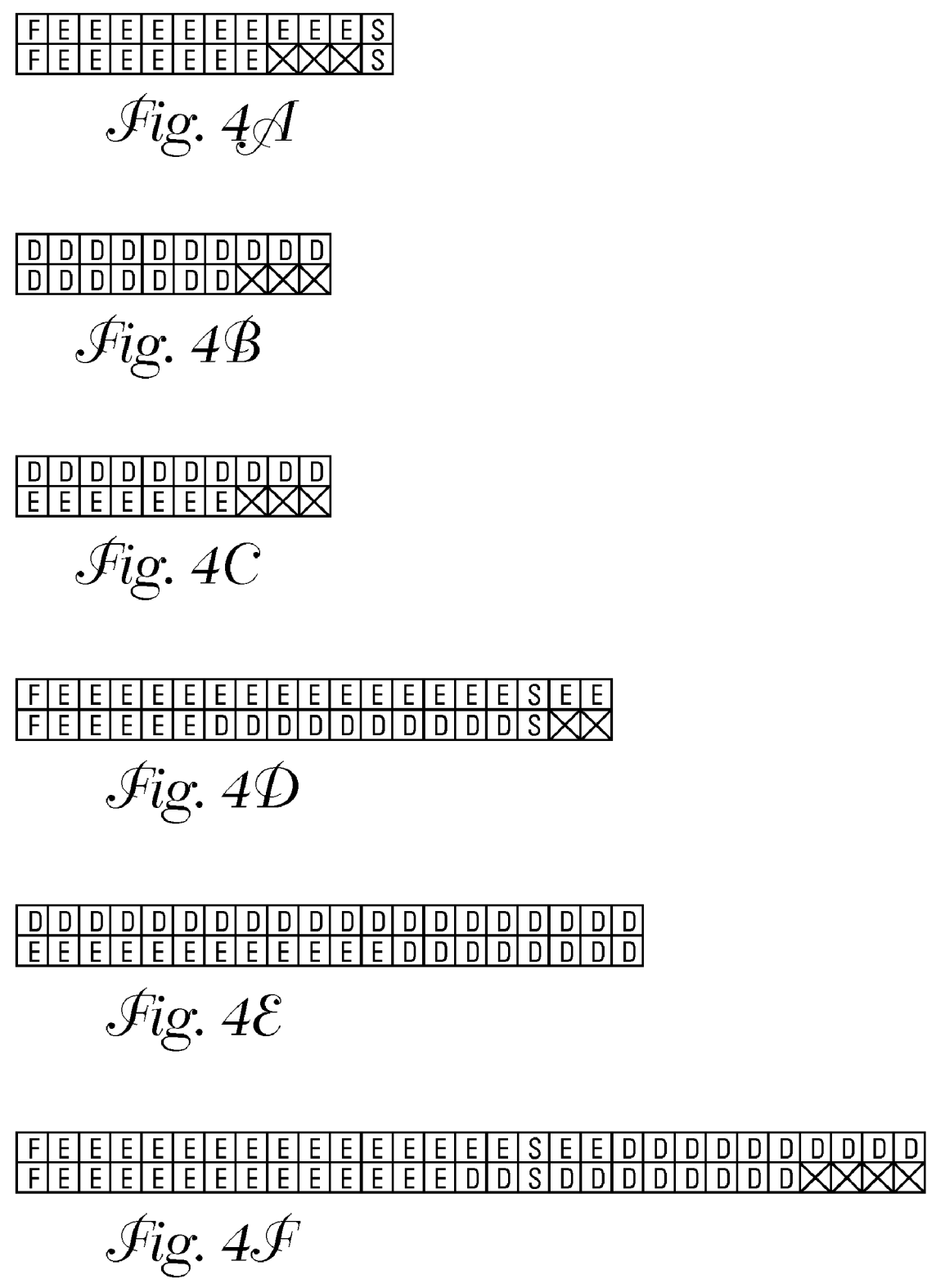

Table 1 is an example of the DSL mapping between two E1 dataports, with FIG. 4A showing example timeslot assignments.

TABLE 1

|  | Side | |
|---|---|---|
|  | LTU | NTU |
| E1 Rate | 10 | 7 |
| E1 Start | 1 | 1 |
| Dataport Rate | 0 | 0 |
| Dataport Start | 0 | 0 |
| DSL Rate | 12 | 12 |

Table 2 is an example of the DSL mapping between two serial dataports, with FIG. 4B showing example timeslot assignments.

TABLE 2

|  | Side | |
|---|---|---|
|  | LTU | NTU |
| E1 Rate | 0 | 0 |
| E1 Start | 0 | 0 |
| Dataport Rate | 10 | 7 |
| Dataport Start | 0 | 0 |
| DSL Rate | 10 | 10 |

Table 3 is an example of the DSL mapping between a serial dataport on one side (the LTU side) and an E1 dataport on the other side (the NTU side), with FIG. 4C showing example timeslot assignments.

TABLE 3

|  | Side | |
|---|---|---|
|  | LTU | NTU |
| E1 Rate | 0 | 7 |
| E1 Start | 0 | 1 |
| Dataport Rate | 10 | 0 |
| Dataport Start | 0 | 0 |
| DSL Rate | 10 | 10 |

Table 4 is an example of the DSL mapping between an E1 dataport on one side (the LTU side) and a dual port on the other side (the NTU side), with FIG. 4D showing example timeslot assignments.

TABLE 4

|  | Side | |
|---|---|---|
|  | LTU | NTU |
| E1 Rate | 17 | 5 |
| E1 Start | 1 | 1 |
| Dataport Rate | 0 | 10 |
| Dataport Start | 0 | 6 |
| DSL Rate | 19 | 19 |

Table 5 is an example of the DSL mapping between a serial dataport on one side (the LTU side) and a dual port on the other side (the NTU side), with FIG. 4E showing example timeslot assignments.

TABLE 5

|  | Side | |
|---|---|---|
|  | LTU | NTU |
| E1 Rate | 0 | 12 |
| E1 Start | 0 | 1 |
| Dataport Rate | 20 | 8 |
| Dataport Start | 0 | 13 |
| DSL Rate | 20 | 20 |

Table 6 is an example of the DSL mapping between two dual ports, with FIG. 4F showing example timeslot assignments.

TABLE 6

|  | Side | |
|---|---|---|
|  | LTU | NTU |
| E1 Rate | 17 | 13 |
| E1 Start | 1 | 1 |
| Dataport Rate | 10 | 10 |
| Dataport Start | 19 | 14 |
| DSL Rate | 29 | 29 |

CONCLUSION

Line termination units have been described herein having dual ports for accepting communication traffic of two different types. The various embodiments facilitate the concurrent transmission of voice traffic, serial data traffic and packetized data traffic across a telecommunication transport system, such as a DSL (digital subscriber line) system. The bandwidth of the telecommunication transport system is allocated between the differing traffic types to permit the full utilization of the available bandwidth.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A termination unit for use in a digital subscriber line system, comprising:
    a first communication interface receiving first traffic having a bandwidth;
    a second communication interface receiving second traffic different from the first traffic; and
    a third communication interface for coupling to a digital subscriber line;
    wherein the termination unit combines the first traffic received at the first communication interface with the second traffic received at the second communication interface, thereby generating a combined traffic, and to provide the combined traffic to the third communication interface; and wherein the combined traffic has a bandwidth greater than or equal to the bandwidth of the first traffic;
wherein the second traffic is unframed;
wherein the first traffic is frame;
wherein the combined traffic is framed when the first traffic has a non-zero bandwidth and is unframed when the first traffic has a zero bandwidth.

2. The termination unit of claim 1, wherein the first communication interface is a G.703/704 interface.

3. The termination unit of claim 1, wherein the second communication interface is an N×64 Kbps serial dataport interface.

4. The termination unit of claim 1, wherein the third communication interface is a G.shdsl interface.

5. A termination unit for use in a digital subscriber line system, comprising:
   a first communication interface receiving first traffic having a first number of timeslots, each timeslot corresponding to an incremental bit rate, wherein a number ($N_1$) of timeslots used for payload is less than or equal to the first number of timeslots;
   a second communication interface receiving second traffic, wherein the second traffic has a bit rate equal to some multiple ($N_2$) of the incremental bit rate; and
   a third communication interface for coupling to a digital subscriber line and for providing a combined traffic having a second number of timeslots, each timeslot corresponding to the incremental bit rate, wherein the second number of timeslots is greater than or equal to $N_1+N_2$;
   wherein the termination unit maps the times lots of the first traffic to a first portion of the timeslots of the combined traffic;
   wherein the termination unit maps the second traffic to a second portion of the timeslots of the combined traffic;
   wherein the first portion of timeslots has a number of timeslots less than or equal to the first number of timeslots and greater than or equal to $N_1$.

6. A method of communicating across a digital subscriber line system, comprising:
   receiving a first traffic having a bandwidth;
   receiving a second traffic different from the first traffic and concurrently with the first traffic;
   combining data of the first traffic with the data of the second traffic, thereby generating a combined traffic; and
   providing the combined traffic to a digital subscriber line of the digital subscriber line system;
   wherein the second traffic is unframed;
   wherein the first traffic is framed;
   wherein the combined traffic is framed when the first traffic has a non-zero bandwidth and is unframed when the first traffic has a zero bandwidth.

7. The method of claim 6, wherein the first traffic is E1 traffic.

8. The method of claim 6, wherein the second traffic is serial data.

9. The method of claim 6, wherein the digital subscriber line is a single-pair high bit-rate digital subscriber line.

10. A method of communicating across a digital subscriber line system, comprising:
    receiving first traffic having a first number of timeslots, each timeslot corresponding to an incremental bit rate, wherein a number ($N_1$) of timeslots used for payload is less than or equal to the first number of timeslots;
    receiving second traffic, wherein the second traffic has a bit rate equal to some multiple ($N_2$) of the incremental bit rate;
    combining the first traffic and the second traffic to generate a combined traffic having a second number of timeslots, each timeslot corresponding to the incremental bit rate, wherein the second number of timeslots is greater than or equal to $N_1+N_2$;
    mapping the timeslots of the first traffic to a first portion of the timeslots of the combined traffic; and
    mapping the second traffic to a second portion of the timeslots of the combined traffic;
    wherein the first portion of timeslots has a number of timeslots less than or equal to the first number of timeslots and greater than or equal to $N_1$.

* * * * *